United States Patent Office 3,281,433
Patented Oct. 25, 1966

3,281,433
PROCESS FOR THE LIQUID PHASE DIRECT OXIDATION OF OLEFINS TO OLEFIN OXIDES
Stanley L. Reid, St. Louis, Mo., assignor to Monsanto Company, a corporation of Delaware
No Drawing. Filed Aug. 20, 1962, Ser. No. 218,113
8 Claims. (Cl. 260—348.5)

This invention is directed to a new and improved process for the preparation of olefin oxides. It is further directed to an improved solvent for use as an oxidation medium for the preparation of olefin oxides by the action of molecular oxygen upon olefins.

Still more particularly this invention relates to a process for the direct epoxidation of olefins with molecular oxygen in a solvent comprising certain esters of benzoic acid.

Olefin oxides are extremely useful articles of commerce. They are used as starting materials for the preparation of anti-freeze compositions, humectants, pharmaceutical preparations, cosmetic formulations, as monomers for the preparation of polymers useful in preparing polyurethanes, and the like. Notable among these epoxides are ethylene oxide and propylene oxide. Currently these are prepared by a vapor phase catalytic method and by the classic two-step chlorohydrin route, respectively. The vapor phase process insofar as industrial production of epoxides is concerned, is apparently confined to the preparation of ethylene oxide. Higher olefins have yet to be used in a vapor phase catalytic process to give economic production of the corresponding oxides. The older chlorohydrin route is the principal industrial process which supplies the largest quantities of propylene oxide for commerce. This process is suitable for conversion of ethylene and propylene to their corresponding epoxides, but higher olefins are not particularly adaptable to the chlorohydrin route.

Still a third process for the preparation of olefin oxides is that involving peracetic acid oxidation of olefins to the corresponding oxides. This process appears to have wider application insofar as olefin structure is concerned than do the first two methods mentioned. It apparently proceeds by an ionic mechanism, and the rate of epoxidation using peracetic acid is characteristic of the structure of the olefin. Highly substituted ethylenes, for example tetramethylethylene and trimethylethylene, react smoothly and rapidly with peracetic acid to give the corresponding epoxides. However, ethylenic compounds having much lower degrees of substitution about the ethylene group, for example, ethylene and propylene, by virtue of the ionic nature of the reaction, react sluggishly with peracetic acid and the rate of formation of the corresponding epoxides is very slow.

Nevertheless, each of these aforementioned processes has inherent disadvantages. For example, vapor phase catalytic oxidation of ethylene to ethylene oxide requires large volume equipment and the handling of tremendous quantities of potentially explosive mixtures of ethylene and oxygen. The second process, that is, the chlorohydrin route, for propylene oxide essentially involves a two-step process; in addition, chlorinated by-products arise in this process. The third process, involving peracetic acid oxidation of olefins, is potentially hazardous if relatively large quantities of peracetic acid are to be used. It is noted, however, that the peracetic acid process is probably the most versatile of the three methods; it is applicable to a far greater range of olefin structures than is the vapor phase catalytic process or the chlorohydrin process.

There are scattered references to still a fourth method of preparing olefin oxides, namely the liquid phase oxidation of olefins with molecular oxygen. Several of these are restrictive in the sense that specific limitations are incorporated in each method. For example, catalysts or other additives or secondary treatment of the oxidation mixtures with basic materials are essential features of these methods.

Since the present invention is concerned with a novel liquid phase epoxidation system, the discussion below will be directed to typical existing prior art schemes for liquid phase olefin oxidations. These prior art processes describe a variety of approaches to a proper balancing of a series of reaction variables in order to obtain the desired olefin oxide. For example, various specific oxidation catalysts or catalyst-solvent systems have been described (U.S. Patents 2,741,623, 2,837,424, 2,974,161, and 2,985,668); another approach is the incorporation of oxidation anticatalysts which retard certain undesirable side reactions (U.S. Patent 2,279,470); still another approach emphasizes the use of water-immiscible hydrocarbon solvents alone, or in the presence of polymerization inhibitors such as nitrobenzene (U.S. Patent 2,780,635) or saturated hydrocarbons (U.S. Patent 2,780,634); another method describes the use of neutralizers such as alkali metal and alkaline earth metal hydroxides, or salts of these metals (U.S. Patent 2,838,524); another approach involves the use of certain catalysts in an alkaline phase (U.S. Patent 2,366,724), or a liquid phase maintained at specified critical pH values (U.S. Patent 2,650,927); and still other approaches emphasize criticality of oxygen pressure (U.S. Patent 2,879,276), or the geometry of the reaction zone (U.S. Patents 2,530,509 and 2,977,374). The foregoing represent prior art approaches to problems encountered in the utilization of a liquid phase oxidation process to obtain olefin oxides.

It is the primary object of the instant invention to provide a superior process for commercial production of olefin oxides which process is free of numerous limitations recited in prior art processes.

A further object of this invention is to provide a liquid phase process for the production of olefin oxides which is not dependent upon the presence or absence of any catalyst; nor dependent upon the water-immiscibility of solvents or upon solvents containing added buffers or acid neutralizers or other additives or secondary treatments with alkaline materials to remove acidic components; nor is it dependent upon the presence of saturated compounds, initiators or anticatalysts; further it is not dependent upon critical reactor geometries, temperatures, pressures, pH level, oxygen concentration flow rates, or reactant ratios.

It is a further object of this invention to provide a new class of solvents for direct epoxidation of olefins with molecular oxygen.

It is an additional object of this invention to provide a new process which is applicable to a wide range of olefin structures; that is, it is not limited to a single olefin or two, but rather, has a broad application over a large class of unsaturated compounds.

It is an additional object of this invention to provide a new process which requires relatively small scale equipment and does not involve the hazards associated with certain of the prior art processes, e.g., the vapor phase process.

Other objects of this invention are to provide a process for the production of olefin oxides in batch or continuous manner by a method which is simple, safe, economical and dependable.

These and other objects of the invention will become apparent to those skilled in the art as description of the invention herein proceeds.

According to the present invention, it has been discovered that olefins can be oxidized to epoxides with molecular oxygen in high conversions and yields when the oxidation is allowed to proceed in a liquid reaction medium comprising at least one benzoic acid ester having the following general formula:

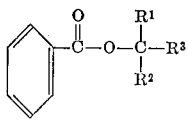

wherein $R^1$, $R^2$, and $R^3$ represent hydrogen, straight chain alkyl or haloalkyl groups having from 1–4 carbon atoms, or straight chain alkyl or haloalkyl groups of from 1–4 carbon atoms having as substituents on other than the terminal carbon atoms thereof at least one member selected from the group consisting of straight and branched chain alkyl or haloalkyl groups having from 1–4 carbon atoms.

Of the benzoic acid ester solvents disclosed herein, the most preferred members are methyl, ethyl and isopropyl benzoates because of their ease of preparation and ready availability.

Still other solvents within the above formula which are suitable herein are the following benzoic acid esters: ethyl benzoate, n-propyl benzoate, butyl benzoate, t-butyl benzoate, 1,1-dimethylpropyl benzoate, 1,1-diethylpropyl benzoate, 1,1-dibutylpentyl benzoate, 1,1-dimethylbutyl benzoate, 1,1,3,3-tetramethylbutyl benzoate, 1,1-dimethyltrichloroethyl benzoate, 1,1-dimethyl-3-fluorobutyl benzoate, 2,2,2-trichloroethyl benzoate, 2-fluoroethyl benzoate, 2,3-dichloropropyl benzoate, 2-methyl-2,3-dichlorobutyl benzoate, 2,3-di(trichloroethyl)butyl benzoate, and the like. In addition to individual benzoic acid esters, mixtures of these esters in varying proportions are also suitably employed as oxidation solvents according to the present invention. For example, a 50–50 weight percent of methyl benzoate and isopropyl benzoate is a desirable mixture.

These benzoic acid ester solvents are readily prepared by conventional methods such as by reacting benzoic acid with the corresponding monohydric alcohol of the desired ester, in the presence of acid catalysts; reacting benzoyl chloride with the corresponding alcohols in the presence of basic materials; reacting benzoic anhydride with the corresponding alcohols in the presence of acid catalysts; reacting benzoic acid and the corresponding alcohol in the presence of an acid catalyst and water entrainment, i.e., azeotroping agents; reacting sodium benzoate, or other metal-benzoate salt, with the halogen derivative corresponding to the alcohol desired, and the like.

The solvents used in the present invention combine essential characteristics and features required for successful solution or liquid phase oxidation, that is, they are essentially chemically indifferent and are oxidatively and thermally stable. Furthermore, the instant solvents are superior to those disclosed in prior art liquid phase olefin oxidation processes in that they do not require buffers, neutralizers, initiators, polymerization or oxidation inhibitors and/or catalysts in order to utilize the above-mentioned essentials to effect oxidation of the olefin to the olefin oxide in high yield and conversion. Solvents of prior art processes require buffers, neutralizers, initiators, inhibitors and/or catalysts in order to promote the oxidation of the olefin and combat the deleterious effects of by-products such as acidic components.

It is known that olefin oxidations give, in addition to epoxides, various by-products such as water, formic acid and acetic acid which can be deleterious to the oxidation when present in appreciable quantities by reacting with the olefin oxide to give corresponding glycol and glycol derivatives as well as undesired polymeric materials. Prior art methods have used a variety of approaches to counteract these deleterious effects, such as the use of water-immiscible hydrocarbon solvents containing inhibitors or utilized in conjunction with a separate washing step with solutions of basic substances, in effect, processes which require acid removal in order for such water-immiscible hydrocarbon solvents to be used for the olefin oxidation.

Probably the most deleterious constituent is formic acid which by virtue of its strong acidity (stronger than acetic acid by a factor of 10) reacts with the desired olefin oxide to form undesirable by-products. It has been found that acetic acid, unlike formic acid, can be tolerated in the reaction mixture in much greater amounts than formic acid without producing any adverse effects. One way to remove the reactive formic acid from the reaction mixture is by salt formation, that is, by addition of an organic or inorganic base. However, these basic compounds are known to inhibit primary oxidation reaction and therefore cannot suitably be used. The formation of salts likewise presents additional mechanical problems due to a build-up thereof in the reactor and salt removal systems must be restorted to.

A feature of the present invention is the scavenging of the deleterious formic acid as it is produced in the reaction through the use of an ester of the class described herein, such as methyl benzoate. An advantage of using these esters as an acid scavenger is that a stable neutral material, i.e., the ester, is used to remove the strong formic acid by ester interchange and at the same time yield relatively innocuous products.

It is a primary feature of the instant invention that the benzoic acid ester solvents need no added substances to counteract the deleterious effect of water and acids. Since the solvents used herein for the olefin oxidation are water-immiscible, water and water-soluble acids formed in the reaction are removed as a separate layer from the benzoic acid ester containing the olefin oxide. Moreover, by use of the instant solvents a surprisingly substantial quantity of water and organic acids can be tolerated without undue adverse effects upon the course of the olefin epoxidation.

It is a further feature of the instant invention that the olefin oxidations proceed at such a rapid rate that the oxygen is quantitatively consumed, hence, accumulation of potentially hazardous explosive mixtures of oxygen and organic materials in the vapor state are avoided.

It is further apparent that there is no criticality insofar as pH value in concerned for this oxidation since appreciable concentrations of acid by-products, for example, up to 20 weight percent of acetic acid is not particularly deleterious. Hence, the olefin oxidation in the present solvents proceeds suitably over a range of pH's as low as pH 4 and in neutral and alkaline pH ranges.

Substantial evidence exists that these olefin oxidations, for example, propylene to propylene oxide by direct oxidation with molecular oxygen are propagated by a free radical chain mechanism. Copper and its compounds are strong inhibitors for this propylene oxidation; an inhibition probably due to a redox reaction of copper with peroxy radicals which interrupts the chain propagation sequence and prevents attainment of a long kinetic chain necessary for reasonable conversion of the olefin. In addition, when free radical inhibitors, that is, antioxidants are added to the reaction mixture, partial or complete inhibition of the olefin oxidation occurs. In the absence of such inhibitors a very rapid, vigorous exothermic oxidation of the olefin occurs in the solvent. Furthermore, the present solvents are apparently very resistant to free radical attack and are recovered substantially unchanged. On the contrary, among prior art solvents benzene is an example of a compound which is readily attacked by free radicals. Such a benzene radical can react with oxygen to give phenolic or quinonoid-type molecules which are known to be efficient inhibitors for radical chain oxidations. Thus, when benzene is used as a solvent for an olefin oxidation its susceptibility to free radical attack gives rise to an effect which might be termed auto-inhibition, that is, the rate of oxidation of the olefin decreases with time. In contrast, the benzoic acid ester solvents have a high order of resistance to radical attack which can apparently be attributed to a stabilization of the phenyl group by the carboxylate group toward radical attack such that these esters do not impede the radical chain sequence, via an auto-inhibition effect which seems to operate when unsubstituted phenyl, i.e., benzene, is employed as solvent. In the instant benzoate ester solvents, the oxidation proceeds to the depletion of either olefin or oxygen.

The benzoic acid ester solvents used in the instant invention constitute a suitable reaction medium for substantially all olefin oxidations with molecular oxygen to form olefin oxides. The term "molecular oxygen" as used herein includes pure or impure oxygen as well as gases containing free oxygen, for example, air.

Olefins suitable for use herein preferably include those of the ethylenic and cycloethylenic series up to 18 carbon atoms per molecule, e.g., ethylene, propylene, butenes, pentenes, hexenes, heptenes, octenes, nonenes, dodecenes, pentadecenes, heptadecenes, octadecenes, cyclobutenes, cyclopentenes, cyclohexenes, cyclooctenes, etc. Of particular interest, utility and convenience are the olefins containing from 2 to 8 carbon atoms. Included are the alkyl-substituted olefins such as 2-methyl-1-butene, 2-methyl-2-butene, 2-methylpropene, 4-methyl-2-pentene, 2-ethyl-3-methyl-1-butene, 2,3-dimethyl-2-butene and 2-methyl-2-pentene. Other suitable olefinic compounds include butadiene, isoprene, other pentadienes, hexadienes, heptadienes, octadienes, decadienes, octadecadienes, alkyl and polyalkyl-substituted cycloalkenes and cycloalkadienes, vinyl-substituted cycloalkenes and benzenes, cyclopentadiene, dicyclopentadiene, styrene, methylstyrene, alkylmethyl-styrene, and other vinyl-substituted aromatic systems. Another class of olefinically unsaturated compounds which are of interest in this direct epoxidation to epoxides are the unsaturated macromolecules, that is, the rubbers, such as butadiene polymers, isoprene polymers, butadiene-styrene copolymers, isobutylene-isoprene copolymers, chloroprene polymers and other copolymers incorporating dienic and vinylic comonomers therein, and the like.

Particularly suitable olefin feed stocks contemplated in the instant invention include the pure olefin or mixtures thereof or olefin stocks containing as much as 50% of saturated compounds. Olefinic feed materials include those formed by cracking petroleum stock such as hydrocarbon oils, paraffin wax, lubricating oil stocks, gas oils, kerosenes, naphthas and the like.

The reaction temperatures used in liquid phase olefin oxidations using the solvents of the instant invention are subject only to a lower limit below which the oxidation either proceeds too slowly or follows a course other than that leading to olefin oxides. The upper limit of the temperature range is that which may be termed a threshold above which substantial decomposition, polymerization or excessive oxidative side reactions occur, thereby leading to undesirable side reactions and products which substantially detract from the yield of the olefin oxide. In general, temperatures of the order of 50° C. to 400° C. are contemplated. It is expedient to maintain temperatures at a sufficiently high level to insure thermal decomposition of hazardous peroxide which may be formed and accumulated to the point of unsafe operation. Within this general temperature range preferred temperatures are within the range of 140–250° C.

Subatmospheric, atmospheric or superatmospheric pressures are suitable for use in the instant invention, that is, ranging from 0.5 to 150 atmospheres. Usually the oxidation reaction is facilitated by the use of higher pressures, hence a preferred pressure range is from 10 to 100 atmospheres. Pressures herein delineated and temperatures described previously will generally be selected, of course, depending upon the characteristics of the individual olefin which is to be oxidized to the olefin oxide, but this combination of temperatures and pressures will be such as to maintain a liquid phase. Olefin oxidations in the instant solvents are autocatalytic, that is, they proceed by free radical chain reaction mechanisms, and the reactions proceed very rapidly after a brief induction period and give remarkably constant product composition over wide variations of conditions. A typical olefin oxidation, for example, propylene in batch operation, requires from about 1 to 20 minutes. Similar, or faster, reaction rates occur in continuous operation. The reaction vessel for conducting this olefin oxidation can be made of materials which may include almost any kind of ceramic material, porcelain, glass, silica, various metals, such as stainless steels, aluminum, silver and nickel, which vessels do not necessarily have to conform to any particular geometric design. It should be noted in the instant invention that no added catalysts are necessary and no reliance is placed upon catalytic activity of the walls of the reactor or reactor components.

Various means known to the art can be utilized for establishing intimate contact of the reactants, i.e., olefin and molecular oxygen in the solvent, for example, by stirring, sparging, shaking, vibration, spraying or other vigorous agitation in the reaction mixture. The vigorous agitation of the reaction mixture effects not only intimate contact of olefin and oxygen, but also facilitates removal of the heat of reaction to suitably oriented heat exchangers. It is to be noted, also, that the exothermic nature of the olefin oxidation is such that very small or negligible amounts of heat need be applied to the reaction system in order to maintain the desired temperature of operation, hence, reaction temperature is adequately maintained by suitable design and proper use of heat exchange components.

As noted above, no added catalysts are required in the present invention. The usual oxidation catalysts can be tolerated although usually no significant benefit accrues from their use because the olefin oxidations proceed in such facile manner in the solvents of the instant invention. Oxidation catalysts such as platinum, selenium, vanadium, manganese, silver, cobalt, chromium, cadmium and mercury in metallic or compound form, preferably as oxide or carbonate or as soluble acetates or carboxylates may be present singly or mixed in gross form supported or unsupported or as finely-divided suspensions or in solutions in the solvent.

It should also be noted that since olefin oxidations according to this invention proceed at such a rapid rate after a brief induction period no initiators, accelerators, or promoters are required, but these may be used to shorten or eliminate the brief induction period after which no additional initiator, promoter or accelerator need be added. Suitable initiators, accelerators or promoters include organic peroxides such as benzoyl peroxide, tertiary-butyl hydroperoxide, di-tertiary-butyl peroxide; inorganic peroxides such as hydrogen and sodium peroxides; organic peracids such as peracetic and perbenzoic acid or various other peroxidic derivatives such as the hydrogen peroxide and hydroperoxide addition products of ketones and aldehydes. Also useful as initiators, promoters, or accelerators for the purpose of reducing the time of the induction period, but following which induction period no more need be added, are readily oxidizable materials such as aldehydes, such as acetaldehyde, propionaldehyde, isobutyraldehyde and the like and ethers such as diethyl ether, diisopropyl ether, and the like.

The reaction mixtures to be used in carrying out the process of the instant invention may be made up in a variety of ways. Exemplary combinations are the olefin and/or oxygen premixed with the solvent, the olefin premixed with the solvent, suitably up to 50% by weight and, preferably, from 10% to 45% by weight of the solvent, and the oxygen added thereto. The solvent-to-olefin molar ratio will vary from 1 to 10. The oxygen-containing gas may be introduced into the olefin-solvent mixture incrementally or continuously. Or, the reactor may be charged with solvent and the olefin and oxygen gas may be introduced simultaneously through separate feed lines into the body of the solvent in a suitable reaction vessel. In one embodiment the olefin and oxygen-containing gas mixture is introduced into the solvent in a continuously stirred reactor, under the conditions of temperatures and pressures selected for this particular olefin. Suitable olefin to oxygen volumetric ratios are within the range of 1 to 5 up to 15 to 1. Feed rates, generally, of oxygen or oxygen-containing gas may vary from 0.5 to 1500 cubic feet per hour or higher and will largely depend upon reactor size within production quantity desired. The oxygen input is adjusted in such manner as to allow virtually complete usage of oxygen, thereby keeping the oxygen concentration in the off-gas above the reaction mixture below about 1%. This safeguard is necessary in order to prevent a hazardous concentration of explosive gases. Proper adjustment of feed rates is of importance in order that the olefin not be stripped from the liquid phase, thus reducing its concentration, hence reducing the rate of oxidation of the olefin which would result in lower conversions per unit time of olefin to olefin oxide. The solvents used herein represent the predominant constituent in the reaction mixture, with respect to all other constituents, including reactants, oxidation products and by-products. By predominant is meant enough solvent is always present to exceed the combined weight of all other constituents. In other words, the reaction mixture comprises major amounts of the solvent and minor amounts of all other constituents with respect thereto.

The oxidation products are removed from the reactor as a combined liquid and gaseous effluent containing the olefin oxide, unreacted components and by-products, by properly adjusting conditions of temperature and pressure and by adjustment of a let-down system, or the entire reaction mixture containing the oxidation products is removed from the reactor. Conventional techniques for separation of desired product including distillation, fractionation, extraction, crystallizations and the like, are employed to effect separation of the desired olefin oxide. One procedure comprises continually removing the liquid effluent from the reaction zone to a distillation column and removing various fractions of products contained therein, in effect, a fractionation to obtain the olefin oxide. From such suitable fractionation process the solvent is recovered and is recycled to the reaction zone.

The invention will be more fully understood by reference to the illustrative specific embodiments presented below.

A modified cylindrical Hoke high pressure vessel is employed for the batch-type oxidations described below. A high pressure fitting was welded to the vessel near one end to serve as gas inlet, and a block valve with rupture disc was attached to this fitting with a one-quarter inch high pressure tubing "goose-neck." A thermocouple was sealed into one end-opening of the vessel. The solvent and initiator (if any employed) are then charged through the other end-opening which is then sealed with the plug. The olefin is then charged to the desired amount, as determined by weight difference, that is, the olefin, if normally gaseous, is charged under pressure, and if normally liquid, may be charged into one of the end openings along with solvent, and the charged vessel is affixed to a bracket attached to a motor driven eccentric which provides vertical vibrational agitation. The tubular Hoke vessel is clamped in a horizontal position in order that the maximum agitation of contents ensues. This vibrating reaction vessel can be immersed in a hot bath for heating to reaction temperatures and removed, then immersed in a cold bath to quench to room temperature.

EXAMPLE I

To a 150-ml. pressure vessel fitted with a thermocouple, rupture disc and gas inlet tube was charged 25.96 g. of methyl benzoate containing 0.20 g. of acetaldehyde and 6.20 g. of propylene. The reactor was sealed, mounted on an agitator assembly and immersed in an oil bath maintained at 200°. When thermal equilibrium was reached, oxygen was admitted to the reactor at 415 p.s.i.g. total pressure. After two and one-half minutes reaction time, an additional 100 p.s.i.g. oxygen pressure was added to the system making a total overpressure of 300 p.s.i.g. with respect to the initial autogeneous reactor pressure (215 p.s.i.g.) at 200° C. A maximum temperature of 234° C. was reached during the oxidation which started immediately upon introduction of the oxygen. After a reaction time of five minutes, the addition of oxygen to the system was stopped and the reactor was immersed in a cold water bath.

Vapor phase chromatographic analyses of the reactor contents showed 40.0% propylene oxide yield among oxygenated products formed at a total conversion of propylene of 29.1%.

EXAMPLE II

To a pressure reactor of the type discussed above is charged 25 g. of methyl benzoate containing 0.1 g. of acetaldehyde and about 5.0 g. of ethylene. The sealed reactor is attached to the agitator assembly and immersed in a hot oil bath at 200° C. When thermal equilibrium is reached within the reactor, oxygen is introduced to a total overpressure of 300 p.s.i.g. The oxidation is carried on for about seven minutes, then terminated as in the above example. Analyses indicate a 12% conversion of ethylene to oxygenated products including a 25% yield of ethylene oxide.

EXAMPLE III

To a pressure reactor similar to the above type is charged 30 g. of methyl benzoate, 0.15 g. acetaldehyde and about 8 g. 2-methyl-2-butene. The sealed reactor is attached to an agitator assembly and immersed in an oil bath at 160° C. When thermal equilibrium is reached within the reactor, an oxygen overpressure of 100 p.s.i.g. is introduced to initiate the reaction followed after a 2 minute interval by an additional 50 p.s.i.g. overpressure of oxygen. After a total reaction period of about 10 minutes, oxygen addition is ceased, and the reactor is cooled in a cold water bath. Analyses indicate a 43% conversion of olefin to oxygenated products with the major product being 2-methyl-2,3-epoxybutane obtained in 46% yield.

EXAMPLE IV

To a 1-liter top-stirred stainless steel reactor is charged about 119 g. of propylene, 290 g. of methyl benzoate, and 3 ml. of acetaldehyde. The reactor is heated to 180° C. and oxygen addition is initiated. The oxidation begins almost immediately as evidenced by a rise in temperature from heat of reaction. The oxidation is run for forty minutes with a final temperature and pressure of 203° C. and 1150 p.s.i.g., respectively. There is obtained about 129 g. of liquid oxygenated products derived from propylene of which propylene oxide is the major constituent.

EXAMPLE V

To a Hoke pressure vessel as described is charged 25 g. of methyl benzoate, 0.1 g. acetaldehyde and about 5 g. styrene. The sealed vessel is attached to an agitator assembly and immersed in an oil bath at 140° C. After thermal equilibrium is reached within the reactor oxygen is added gradually over an approximate 10 minute reaction period to a total oxygen pressure of 250 p.s.i.g. The reaction is quenched as above to obtain a 55% conversion of olefin to oxygenated products among which styrene oxide is a major constituent.

EXAMPLE VI

To a pressure reactor is charged methyl benzoate, acetaldehyde initiator and butadiene. The sealed reactor is attached to an agitator assembly and immersed in an oil bath at 160° C. When thermal equilibrium is attained, oxygen is introduced to a total pressure of 200 p.s.i.g. over a reaction period of about 8 minutes. The oxygen is shut off and the reactor is cooled in a cold water bath. Analyses indicate a 65% conversion to oxygenated products containing butadiene oxide in 22% yield.

EXAMPLE VII

This example exemplifies a continuous operation for olefin oxidation using methyl benzoate as the reaction medium.

A 1.0-liter stirred stainless steel reactor is employed, fitted with three feedlines to introduce propylene, oxygen and methyl benzoate solvent into a bottom inlet in the reactor. A product over-flow pipe drains gaseous and liquid product continuously into a product separation system.

Using methyl benzoate as solvent, the reactor is heated to 200° C. and propylene is charged to about 20% by weight of the solvent. The reaction is initiated by incremental additions of oxygen, then the three reactants are metered into the reactor as the oxidation products are continuously removed. In a typical run, the reactants are added at about the following hourly rates: propylene, 500 g, oxygen, 300 g., methyl benzoate, 4400 g. At a steady reaction state with reactor residence time of about 4 minutes, the conversions are, approximately, propylene 48%, oxygen 97% and propylene oxide yield is approximately 48%.

EXAMPLE VIII

To a pressure reactor of the type discussed above is charged 25 g. of 1,1-dimethylbutyl benzoate containing 0.1 g. of acetaldehyde and about 5.0 g. of ethylene. The sealed reactor is attached to the agitator assembly and immersed in a hot oil bath at 200° C. When thermal equilibrium is reached within the reactor, oxygen is introduced to a total overpressure of 300 p.s.i.g. The oxidation is carried on for about seven minutes, then terminated as in the above examples. Analyses indicate a 12% conversion of ethylene to oxygenated products including a 25% yield of ethylene oxide.

EXAMPLE IX

To a pressure reactor similar to the above type is charged 30 g. of 1,1-dimethyl trichloroethyl benzoate, 0.15 g. acetaldehyde and about 8 g. of 2-methyl-2-butene. The sealed reactor is attached to an agitator assembly and immersed in an oil bath at 160° C. When thermal equilibrium is reached within the reactor, an oxygen overpressure of 200 p.s.i.g. is introduced to initiate the reaction followed after a 2 minute interval by an additional 100 p.s.i.g. overpressure of oxygen. After a total reaction period of about 10 minutes, oxygen addition is ceased, and the reactor is cooled in a cold water bath. Analyses indicate a 43% conversion of olefin to oxygenated products with the major product being 2-methyl-2,3-epoxybutane obtained in 46% yield.

EXAMPLE X

To a 1-liter top stirred stainless steel reactor is charged approximately 119 g. of propylene, 296 g. of neopentyl benzoate, and 3 ml. of actaldehyde. The reactor is heated to 180° C. and oxygen addition is initiated. The oxidation begins almost immediately as evidenced by a rise in temperature from heat of reaction. The oxidation proceeds for about forty minutes with a final temperature and pressure of 200° C. and 1100 p.s.i.g., respectively. There is obtained approximately 139 g. of liquid oxygenated products of which propylene oxide is the major constituent.

EXAMPLE XI

To a Hoke pressure vessel as described above is charged 25 g. of 1,1,3,3-tetramethylbutyl benzoate, 0.1 g. actaldehyde and about 5 g. styrene. The sealed vessel is attached to an agitator assembly and immersed in an oil bath at 140° C. After thermal equilibrium is reached within the reactor oxygen is added gradually over about 10 minute reaction period to a total oxygen pressure of 250 p.s.i.g. The reaction is quenched as above to obtain an approximate 55% conversion of olefin to oxygenated products among which styrene oxide is a major constituent.

EXAMPLE XII

To a pressure reactor is charged 1,1-dimethylpropyl benzoate, acetaldehyde initiator and butadiene. The sealed reactor is attached to an agitator assembly and immersed in an oil bath at 160° C. When thermal equilibrium is attained, oxygen is introduced to a total pressure of 200 p.s.i.g. over a reaction period of about 8 minutes. The oxygen is shut off and the reactor is cooled in a cold water bath. Analyses indicate a 55% conversion of oxygenated products containing butadiene oxide in about 22% yield.

EXAMPLE XIII

To a 150-ml. pressure vessel fitted with thermocouple, rupture disc and gas-inlet assembly was charged 25.16 g. of ethyl benzoate, 0.13 g. of acetaldehyde (to reduce the induction time) and 6.07 g. of propylene. The reactor was sealed, mounted on an agitator assembly and immersed in a polyethylene glycol bath maintained at 190° C. When thermal equilibrium was reached the autogenous pressure of the vessel was 217 p.s.i.g. Oxygen was introduced at 100 p.s.i.g. over-pressure, then increased slowly until 460 p.s.i.g. total pressure was reached. A maximum temperature of 213° C. was reached, and at four minutes the oxygen was turned off and the reactor was immersed in a cold water bath. Analyses by vapor phase chromatography of the reactor contents indicated an overall conversion of propylene of 15.1% to oxygenated products, among which propylene oxide was obtained in 39.9% yield.

EXAMPLE XIV

To the Hoke pressure vessel described above was charged 23.48 g. of isopropyl benzoate, 0.13 g. of acetaldehyde (to reduce time of induction period) and 6.14 g. of propylene. The vessel was sealed, attached to the agitator assembly of the oxidation apparatus and immersed in a polyethylene glycol bath maintained at 190° C. An autogenous pressure of 200 p.s.i.g. developed when thermal equilibrium was reached. Oxygen was introduced at 310 p.s.i.g. total pressure whereupon oxidation commenced immediately. The oxygen feed pressure was slowly increased to 452 p.s.i.g. total pressure and a maximum temperature of 203° C. was reached. At five minutes, the oxygen was turned off and the vessel was immersed in a cold water bath. Vapor phase chromatographic analyses of the reaction mixture indicated a 10.2% conversion of propylene to oxygenated products among which propylene oxide was obtained in 58.1% yield.

Various other modifications of the instant invention will be apparent to those skilled in the art without departing from the spirit and scope thereof.

I claim:
1. Process for the preparation of olefin oxides which comprises oxidizing an epoxidizable olefinically unsaturated hydrocarbon compound having up to 18 carbon atoms with molecular oxygen at a temperature within the range of from 50° C. to 400° C. and pressures within the range of from 0.5 to 150 atmospheres in a liquid reaction medium consisting essentially of an ester selected from the group consisting of benzoic acid esters having the formula:

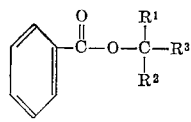

and mixtures thereof, wherein $R^1$, $R^2$ and $R^3$ are selected from the group consisting of hydrogen, straight chain alkyl and haloalkyl groups having from 1 to 4 carbon atoms and straight chain alkyl and haloalkyl groups having from 1 to 4 carbon atoms having as substituents on other than the terminal carbon atom thereof a member selected from the group consisting of alkyl and haloalkyl groups having from 1 to 4 carbon atoms.

2. Process according to claim 1 wherein the oxidation occurs in the absence of added catalysts.

3. Process for the preparation of propylene oxide which comprises oxidizing propylene with molecular oxygen at a temperature within the range of from 140° C. to 250° C. and a pressure within the range of from 10 to 100 atmospheres in a liquid reaction medium as described in claim 1.

4. Process according to claim 3 wherein said reaction medium consists essentially of methyl benzoate.

5. Process according to claim 3 wherein said reaction medium consists essentially of ethyl benzoate.

6. Process according to claim 3 wherein said reaction medium consists essentially of isopropyl benzoate.

7. Process according to claim 3 wherein said liquid reaction medium consists essentially of a mixture of said benzoic acid esters.

8. Process according to claim 7 wherein said liquid reaction medium consists essentially of a mixture of methyl benzoate and isopropyl benzoate.

References Cited by the Examiner

UNITED STATES PATENTS

| | | | |
|---|---|---|---|
| 1,995,991 | 3/1935 | Lenher | 260—348.5 |
| 2,475,605 | 7/1949 | Prutton et al. | 260—348.5 |
| 2,784,202 | 3/1957 | Gardner et al. | 260—348.5 |
| 2,985,668 | 5/1961 | Shingu | 260—348.5 |

FOREIGN PATENTS 718,603   11/1954   Great Britain.

OTHER REFERENCES

Bergmann, The Chemistry of Acetylene and Related Compounds, page 20, Interscience Publishers Inc., New York (1948).

Durrans, T. H., Solvents, 7th ed. (1957), pp. XV and 128–147.

WALTER A. MODANCE, *Primary Examiner*.

IRVING MARCUS, JOHN D. RANDOLPH, NICHOLAS RIZZO, *Examiners*.

JAMES A. FRIEDENSON, NORMA MILESTONE, *Assistant Examiners*.